Dec. 26, 1933.  L. PAVIA  1,941,317

SHUTTLE

Filed Jan. 17, 1933

WITNESSES

INVENTOR
Luigi Pavia
BY

ATTORNEYS

Patented Dec. 26, 1933

1,941,317

UNITED STATES PATENT OFFICE 1,941,317

SHUTTLE

Luigi Pavia, Allentown, Pa.

Application January 17, 1933. Serial No. 652,208

5 Claims. (Cl. 139—208)

This invention relates to shuttles and has for an object to provide an improved construction wherein the conventional appearing shuttle is provided but means are associated therewith which may be adjusted from time to time for holding the spindle always in a central position.

Another object is to provide a shuttle wherein substantially the usual type of spindle is used but means are associated therewith which will not interfere with the usual action thereof but will prevent the spindle from moving downwardly to the bottom of the shuttle body.

A further object, more specifically, is to provide an adjustable stop removably located in a shuttle near one end thereof for limiting the downward or inward swinging movement of the spindle, the adjustability of the device taking care of the wear on the respective parts.

In the accompanying drawing—

Figure 1:
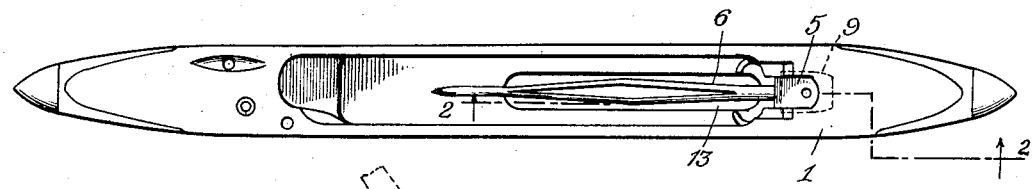
Figure 1 is a top plan view of a shuttle disclosing an embodiment of the invention.

Referring to the accompanying drawing by numerals, 1 indicates a shuttle body of substantially the usual structure, except that it is provided with a slot 2 for the reception of a tool as hereinafter fully described. The shuttle body 1 is provided with the usual spring 3 operating the headed pin 4 which acts on the head 5 of the spindle 6 to hold the spindle in its closed position, as shown in full lines in Figure 2, or in its open position as shown in dotted lines in Figure 2. The head 5 is of the usual construction except that there is a cutaway portion 7 resulting in a shoulder 8 against which the spindle stop 9 acts. The body 1 is cutaway at 10 for receiving the stop 9 which is preferably substantially rectangular when the parts are as shown in Figures 2 and 3.

Figure 4:
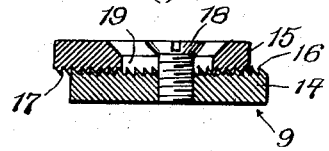
Figure 4 is an enlarged sectional view through Figure 3 approximately on the line 4—4; the same illustrating how the respective parts may be adjusted.

The stop 9 is slid into position by longitudinal movement from the opening 11 toward the end of the shuttle. When the parts are new they are arranged as shown in Figure 2. During the operation of the shuttle the parts become more or less worn and the spring 3 in order to function properly is made rather strong, so that ordinarily the spindle 6 would gradually take a lower and lower position until it would strike the inside surface 12 of the bottom 13 of the shuttle body 1. This, of course, is objectionable as the yarn will not feed readily from the spindle. To prevent this and to maintain the spindle always positioned centrally as shown in Figure 2, the spindle stop 9 has been provided positioned to rest against the shoulder 10. When the parts have become worn slightly the spindle 6 begins to drop downwardly, and stop 9 is removed and the parts adjusted as shown in Figure 4. The stop is then put back into position.

From Figure 4 it will be seen that stop 9 consists of plates 14 and 15, plate 14 having teeth 16 on its upper surface, and plate 15 having teeth on its lower surface. Teeth 16 and 17 are adapted to continually mesh so that the screw 18 will rigidly hold the plates together. It will be noted that the screw 18 exends through the slot 19 so that the plates may be readily adjusted to a considerable extent. By this adjustment the effective length of the stop 9 is varied, and this variation or additional length causes the stop 9 to engage shoulder 8 in a way to hold the spindle 6 centrally.

Figure 2:
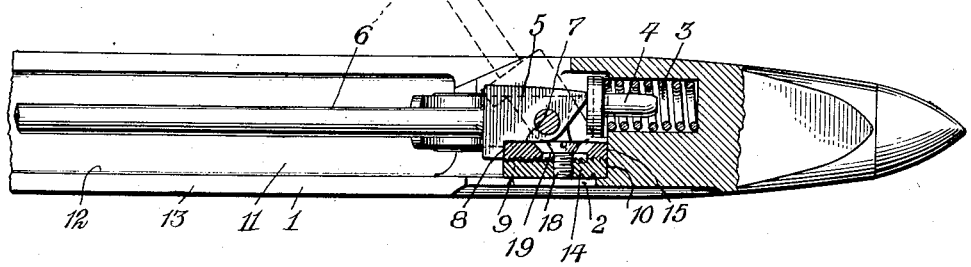
Figure 2 is an enlarged sectional view through Figure 1 on the line 2—2.
Figure 3:
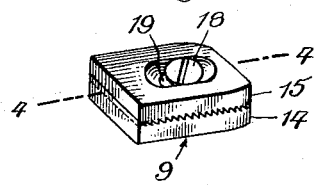
Figure 3 is a perspective view of the adjustable spindle stop shown in Figure 2.

When moving the stop 9 a screw driver or other tool may be inserted through the slot 2 and the stop engaged and forced to the left as viewed in Figure 2. By adjusting the plates of stop 9 from time to time the spindle 6 may be maintained in a substantially central position continually, and thus the owner of the shuttle will get much more wear out of the same than heretofore.

I claim:

1. In a shuttle provided with a spindle, of a stop plate movable longitudinally of the shuttle adapted to limit the angle of swinging movement of the spindle, and means for locking said plate in different positions.

2. In a shuttle provided with a body having a shoulder and a pivotally mounted spindle having a head, said head being provided with a shoulder, of an adjustable stop carried within said body with one end normally resting against the shoulder of the body and the other against the shoulder of said head, said stop comprising a pair of plates adjustable longitudinally of the shuttle and means for locking the plates together to prevent independent movement thereof.

3. A shuttle including a body, a spindle pivotally mounted in the body, said spindle being formed with a head having a shoulder, a spindle stop arranged within said body and positioned with one end resting against part of the body and the other resting against said shoulder, said spindle stop being formed of a plurality of plates adjustable with respect to each other whereby the effective length of the stop may be varied, and means for locking said plates in adjusted positions.

4. In a shuttle, a spindle stop therefor comprising a pair of plates adjustable with respect to each other to vary their combined effective length, and means for locking the respective plates in different adjusted positions.

5. In a shuttle, a spindle stop comprising a pair of plates each plate being provided with a serrated surface, said surfaces being arranged in engagement, one of said plates having a threaded aperture and the other of said plates having a slot, a screw extending through said slot into said threaded aperture for clamping said plates together.

LUIGI PAVIA.